United States Patent [19]

Longhouse et al.

[11] 4,433,263

[45] Feb. 21, 1984

[54] COMMUTATOR HAVING SEGMENTS WITH A VARIED DIMENSION

[75] Inventors: Richard E. Longhouse; William D. Cornwell, Jr., both of Dayton; Harry C. Buchanan, Jr., Spring Valley, all of Ohio

[73] Assignee: General Motors Corporation, Detroit, Mich.

[21] Appl. No.: 391,127

[22] Filed: Jun. 23, 1982

[51] Int. Cl.³ .............................................. H02K 13/04
[52] U.S. Cl. ...................................... 310/233; 310/51; 310/237; 181/175
[58] Field of Search ................................ 310/233–237, 310/51, 227, 219, 220, 221; 340/648; 29/597; 181/175

[56] References Cited

U.S. PATENT DOCUMENTS

| | | | |
|---|---|---|---|
| 2,285,201 | 6/1942 | Groot et al. | 310/236 |
| 2,956,186 | 10/1960 | Wall | 310/65 |
| 3,314,132 | 4/1967 | Van Dorn | 310/236 |
| 4,099,077 | 7/1978 | Maekawa | 310/237 |
| 4,188,713 | 2/1980 | Kawano | 310/235 |
| 4,224,542 | 9/1980 | Kawano | 310/235 |

FOREIGN PATENT DOCUMENTS

| | | | |
|---|---|---|---|
| 284534 | 8/1913 | Fed. Rep. of Germany | 310/236 |
| 113239 | 12/1965 | Netherlands | 310/237 |
| 227419 | 6/1943 | Switzerland | 310/236 |
| 940027 | 10/1963 | United Kingdom | 310/236 |

OTHER PUBLICATIONS

R. C. Mellin & G. Souran, "Controlling Tonal Characteristics of the Aerodynamic Noise . . ."; Journal of Basic Engineering.

*Primary Examiner*—R. Skudy
*Attorney, Agent, or Firm*—Robert M. Sigler

[57] ABSTRACT

A commutator has a plurality of spaced, electrically conducting segments, each of which has a physical dimension determining the relative time duration of brush contact with said segment during commutator rotation with audible brush noise being generated between the brush and said consecutive segments, the noise including a fundamental frequency component at a frequency related to the frequency at which the consecutive segments pass the brush. The physical dimension of the consecutive segments varies from each segment to the next according to a predetermined pattern effective to vary the relative time of brush contact from each segment to the next during rotation and thus reduce the amplitude of the fundamental frequency components to make the brush noise less tonal in character and thus less annoying.

4 Claims, 3 Drawing Figures

COMMUTATOR HAVING SEGMENTS WITH A VARIED DIMENSION

BACKGROUND OF THE INVENTION

This invention relates to commutators for dynamoelectric machines. In such commutators, a plurality of electrically conducting segments are rotated by the armature consecutively past one or more stationary, electrically conducting brushes to commutate the armature current during machine operation. It has been found, however, that the operation of such a commutator is a source of audible noise as the brushes slide across the commutator segment surfaces, and particularly as the brushes move from each commutator segment to the next. As the commutator segments are rotated past the brushes, each brush traces a contact path across the surface of the segment. In standard commutator construction, segments are of equal size, shape and spacing so that these contact paths are all of substantially equal length. Therefore, as the armature rotates at a substantially constant speed, the changes in audible sound caused by the brush traversing from one segment to the next occur at a substantially constant frequency. The effect of this substantially constant frequency is to render the audible brush noise of the motor substantially tonal in character; and tonal noises appear to be more annoying and objectionable to a listener than broad spectrum frequency noises of substantially the same average noise power.

SUMMARY OF THE INVENTION

Therefore, it is an object of this invention to provide a commutator for a dynamoelectric machine which produces an audible brush noise having a less tonal character which is less annoying to a human listener.

It is a further object of this invention to provide such a commutator in which the electrical performance of the machine is not substantially degraded.

These and other objects are obtained in a commutator of the type adapted to be rotationally driven by a dynamoelectric machine and having a plurality of spaced, electrically conducting segments adapted to consecutively contact at least one stationary, electrically conducting brush member as the commutator is rotationally driven. Each of the segments has a physical dimension determining the relative time duration of brush contact with said segment during rotation; and said physical dimension of the consecutive segments varies from each segment to the next according to a predetermined pattern effective to vary the relative time of brush contact from each segment to the next during the rotation and thus reduce the amplitude of the fundamental frequency component of the brush noise at a given rotational speed for a less tonal and therefore less annoying brush noise.

Further details and advantages of this invention will be apparent in the accompanying drawings and following description of the preferred embodiment.

DESCRIPTION OF THE PREFERRED EMBODIMENT

Figure 1:
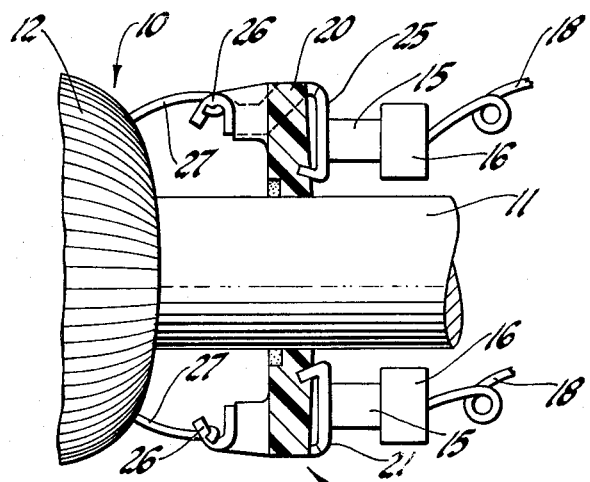
FIG. 1 shows a portion of a dynamoelectric machine including an axial sectional view of a commutator according to this invention.

FIG. 1 shows a portion of the armature 10 of the dynamoelectric machine. Armature 10 includes an armature shaft 11 which carries armature windings 12 and a commutator 14 in rotation therewith. A pair of brushes 15 in brush holders 16 with lead wires 18 are a portion of the stationary apparatus of the dynamoelectric machine and are shown in their proper positions relative to the commutator 14 to illustrate the action thereof, although the supporting apparatus and all the other stationary apparatus of the dynamoelectric machine are omitted for simplicity in the drawings. The entire dynamoelectric machine is conventional in structure except for the size and/or shape of the commutator segments as will be described below.

Commutator 14 comprises a molded plastic ring member 20 which holds a plurality of commutator segments 21. The commutator segments 21 may be manufactured in the form of a toroidal copper ring having a flat axial surface 25 and a plurality of connecting hook members 26 projecting from the back thereof. The plastic ring has been molded around the copper ring with the axial copper face and connecting ends of the hook members exposed; and the axial copper face may then be cut into segments retained in place by the plastic ring member with each segment being connected to one of the hook members. As seen in FIG. 1, hook members 26 provide electrical connection for wires 27 brought out from armature windings 12.

Figure 2:
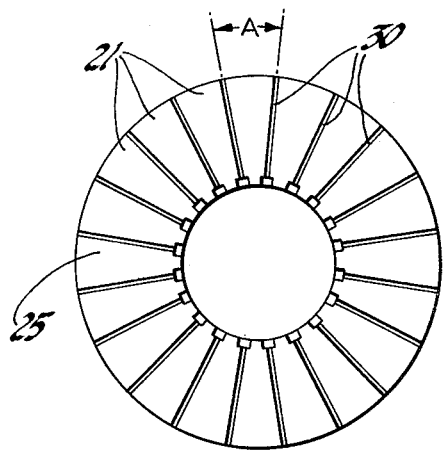
FIG. 2 shows an axial end view of the commutator of FIG. 1.

FIG. 2 shows that the finished commutator, when viewed axially, shows a plurality of segments 21 separated by slots 30. Slots 30 electrically insulate segments 21 from each other, as does the plastic ring member 20. A physical dimension A of segments 21, which may be, in FIG. 2, the angle A between each consecutive slot 30 and one of said slots 30 taken as a common reference slot, defines the relative length of brush contact between one of the brushes 15 and the segment 21 as the segment 21 is carried past brush 15 by the rotating armature 10. At a constant rotational speed, the difference between consecutive angles A will be directly proportional to the actual brush contact path across the width of segment 21 from slot 30 to the next. If consecutive angle A increase by a constant number of degrees, the noise produced by brush 15 contacting consecutive segments 21 would be highly tonal at a fundamental frequency which is a whole multiple of the rotational speed of the armature. However, if consecutive angles A increase by a variant number of degrees, the amplitude of the fundamental frequency will be reduced relative to the other frequency components; and the noise wil be less tonal in character. In accordance with this invention, the angles A are varied from one segment 21 to the next in accordance with a specific pattern designed to minimize the tonal character of the audible brush noise. In the embodiment shown in FIG. 2, there are twenty commutator segments 21 and thus twenty slots 30 separating the segments. The angular distances of each consecutive slot 30 from a common slot are shown in the following table:

| Slot Number | Angle |
| --- | --- |
| 1 | 16° 57' 45" |
| 2 | 34° 1' 6" |
| 3 | 51° 15' 16" |
| 4 | 68° 44' 44" |
| 5 | 86° 32' 46" |
| 6 | 104° 41' 2" |
| 7 | 123° 9' 17" |
| 8 | 141° 55' 6" |
| 9 | 160° 54' 3" |
| 10 | 180° |
| 11 | 199° 5' 58" |
| 12 | 218° 4' 55" |
| 13 | 236° 50' 44" |
| 14 | 255° 18' 58" |
| 15 | 273° 27' 14" |
| 16 | 291° 15' 16" |
| 17 | 308° 44' 44" |
| 18 | 325° 58' 55" |
| 19 | 343° 2' 16" |
| 20 | 360° |

Figure 4:
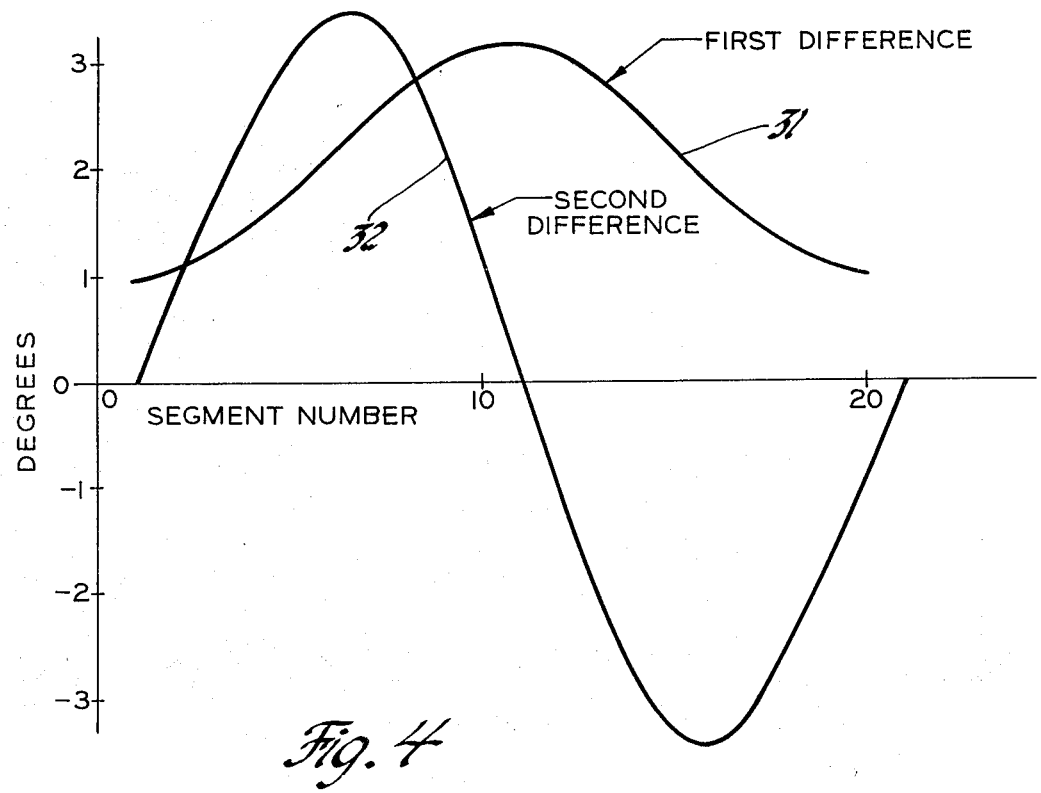
FIG. 4 shows a pair of plots illustrating the variation in angular segment width of consecutive segments in the commutators of FIGS. 2 and 3.

The pattern of these angles is illustrated in the plots of FIG. 4. The first difference between consecutive angles in the preceding table, which represents the actual angular dimension A between the centers of neighboring slots 30, is plotted as a function of the segment number in plot 31. It is apparent from this plot that dimension A varies in a symmetrical manner between maximum and minimum values separated by 180°. Plot 32 of FIG. 4 shows the second difference of the values in the preceding table, which comprises the difference between the values of the first difference. It can be seen that the plot of the second difference is essentially in the form of a sine wave having a peak-to-peak amplitude of substantially six and one half degrees and completing one full cycle in a rotation of the commutator. The values of angles in the preceding table were computed in accordance with an algorithm described in a paper by R. C. Mellin and G. Sovran entitled "Controlling the Tonal Characteristics of the Aerodynamic Noise Generated by Fan Rotors", which paper appeared in the March, 1970 edition of the Journal of Basic Engineering, published by the American Society of Mechanical Engineers. The algorithm in the paper was developed to reduce the tonality of the noise generated by the blades of a fan by assymetrically spacing the fan blades. The algorithm is specifically intended to reduce the amplitude of the fundamental frequency of the tonal noise in relation to the next most intense harmonic. Since the audible brush noise of motors tends also to be tonal in character, the same algorithm is used in computing the angles of the segments in the commutator of this invention. However, to the knowledge of the inventors of this commutator, it has not before been suggested in the field of commutators and brush noise to provide commutator segments having a varying brush contact path to reduce the tonality of said brush noise. In addition, before a commutator according to this invention was built and tested, there was some speculation as to whether this type of commutator design would actually reduce the tonality of the noise and whether it would adversely affect the electrical characteristics of the dynamoelectric machine. However, it was found that these electrical operating characteristics were not adversely affected, at least by the design summarized in the preceding table. It was further found that indeed the brush noise became less tonal and less annoying, even though the overall noise level was not greatly reduced.

Figure 3:
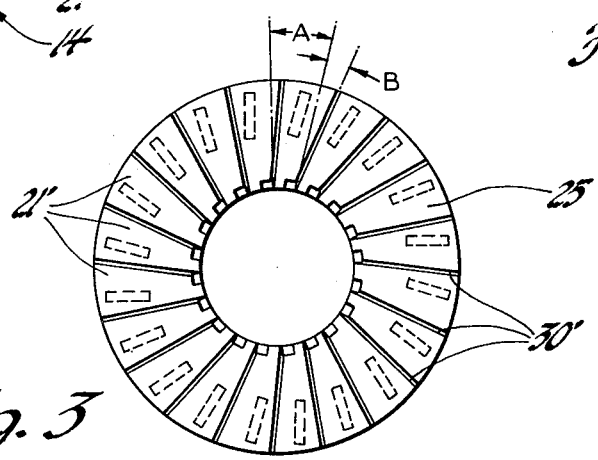
FIG. 3 shows an axial end view of another embodiment of the commutator seen in FIG. 2.

FIG. 3 shows a variation on the embodiment shown in FIG. 2 in which the slots 30' between segments 21' are not truly radial but form equivalent angles B with an intersecting radial line. Thus the entire width of the brush does not encounter the slot at the same time and the variation in noise attributable the brush crossing the slot is thus possibly further reduced or spread in frequency. This particular technique is known in the art; however, this technique can also be used in the commutator of this invention, if the angles formed by the radii which cross slots 30' at a common radius are computed according to the preceding table as they were in the embodiment of FIG. 2.

The embodiments of the invention in which an exclusive property or privilege is claimed are defined as follows:

1. A commutator of the type adapted to be rotationally driven by a dynamoelectric machine and having a plurality of spaced, electrically conducting segments adapted to consecutively contact at least one stationary, electrically conducting brush member as the commutator is rotationally driven, each of said segments having a physical dimension (A) determining the relative time duration of brush contact with said segment during said rotation, said commutator being subject to the generation of audible tonal brush noise between said brush and said consecutive segments during said rotation which includes frequency components including a fundamental frequency component at a frequency related to the frequency at which said consecutive segments pass said brush, wherein said physical dimension (A) of said consecutive segments varies from each segment to the next according to a predetermined pattern effective to vary the relative time of brush contact from each segment to the next during said rotation and thus reduce the amplitude of said fundamental frequency component relative to other frequency components, whereby said brush noise is made less tonal in character and thus less annoying.

2. A commutator of the type adapted to be rotationally driven by a dynamoelectric machine and having a plurality of spaced, electrically conducting segments adapted to consecutively contact at least one stationary, electrically conducting brush member as the commutator is rotationally driven, each of said segments having a physical dimension (A) determining the relative time duration of brush contact with said segment during said rotation, said commutator being subject to the generation of audible tonal brush noise between said brush and said consecutive segments during said rotation which includes frequency components including a fundamental frequency component at a frequency related to the frequency at which said consecutive segments pass said brush, wherein the second difference of said physical dimension (A) of said consecutive segments varies from each segment to the next substantially in accordance with a sine wave completing one full cycle in one full circumference of the commutator, said variation being effective to vary the relative time of brush contact from each segment to the next during said rotation to reduce the amplitude of said fundamental frequency component relative to other frequency components, whereby said brush noise is made less tonal in character and thus less annoying.

3. A commutator of the type adapted to be rotationally driven by a dynamoelectric machine armature and having a plurality of flat, electrically conducting segments in a plane normal to the axis of the armature, the segments being separated by slots forming a common angle with intersecting radii and being adapted to consecutively contact at least one stationary, electrically conducting brush member as the commutator is rotationally driven, each of said segments defining an angle between its bordering slots which determines the relative time duration of brush contact with said segment during said rotation, said commutator being subject to the generation of audible tonal brush noise between said brush and said consecutive segments during said rotation which includes frequency components including a fundamental frequency component at a frequency related to the frequency at which said consecutive segments pass said brush, wherein said defined angle of said consecutive segments varies from each segment to the next according to a predetermined pattern effective to vary the relative time of brush contact from each segment to the next during said rotation and thus reduce the amplitude of said fundamental frequency component relative to other frequency components, whereby said brush noise is made less tonal in character and thus less annoying.

4. The commutator of claim 3 in which the angle between bordering slots of consecutive segments varies with a second difference in a sine wave pattern having a peak to peak amplitude of substantially six and one half degrees.

* * * * *